United States Patent [19]

Bickford

[11] Patent Number: 5,662,579
[45] Date of Patent: Sep. 2, 1997

[54] VITRIFICATION OF ORGANICS-CONTAINING WASTES

[75] Inventor: Dennis F. Bickford, Aiken, S.C.

[73] Assignee: The United States of America as represented by the United States Department of Energy, Washington, D.C.

[21] Appl. No.: 408,157

[22] Filed: Mar. 21, 1995

[51] Int. Cl.$^6$ .............. A62D 3/00; B09B 3/00; G21F 9/00

[52] U.S. Cl. .............. 588/256; 588/11; 588/18; 588/224; 588/236; 588/252

[58] Field of Search .............. 588/11, 18, 222, 588/223, 224, 236, 252, 253, 256

[56] References Cited

U.S. PATENT DOCUMENTS

| | | | |
|---|---|---|---|
| 4,294,703 | 10/1981 | Wilms et al. | 210/631 |
| 4,395,367 | 7/1983 | Rohrmann et al. | 588/11 |
| 4,464,294 | 8/1984 | Thiele | 588/11 |
| 4,751,005 | 6/1988 | Mitsui et al. | 210/759 |
| 4,861,484 | 8/1989 | Lichtin et al. | 210/638 |
| 5,145,587 | 9/1992 | Ishii et al. | 210/759 |
| 5,192,452 | 3/1993 | Mitsui et al. | 210/760 |
| 5,304,708 | 4/1994 | Buehler | 588/256 |
| 5,424,042 | 6/1995 | Mason et al. | 588/252 X |
| 5,435,942 | 7/1995 | Hsu | 588/252 X |
| 5,461,185 | 10/1995 | Forsberg et al. | 588/11 |

OTHER PUBLICATIONS

Sargent, Jr., Thomas N.; vitrification if Cesium–Contaminated Organic Ion Exchange Resin: Aug., 1994, pp. 1–80; Graduate School of Clemson University, Clemson, SC.

*Primary Examiner*—George A. Suchfield
*Attorney, Agent, or Firm*—Harold M. Dixon; William R. Moser; Paul A. Gottlieb

[57] ABSTRACT

A process for stabilizing organics-containing waste materials and recovering metals therefrom, and a waste glass product made according to the process. Vitrification of wastes such as organic ion exchange resins, electronic components and the like can be accomplished by mixing at least one transition metal oxide with the wastes, and, if needed, glass formers to compensate for a shortage of silicates or other glass formers in the wastes. The transition metal oxide increases the rate of oxidation of organic materials in the wastes to improve the composition of the glass-forming mixture: at low temperatures, the oxide catalyzes oxidation of a portion of the organics in the waste; at higher temperatures, the oxide dissolves and the resulting oxygen ions oxidize more of the organics; and at vitrification temperatures, the metal ions conduct oxygen into the melt to oxidize the remaining organics. In addition, the transition metal oxide buffers the redox potential of the glass melt so that metals such as Au, Pt, Ag, and Cu separate from the melt in the metallic state and can be recovered. After the metals are recovered, the remainder of the melt is allowed to cool and may subsequently be disposed of. The product has good leaching resistance and can be disposed of in an ordinary landfill, or, alternatively, used as a filler in materials such as concrete, asphalt, brick and tile.

20 Claims, 1 Drawing Sheet

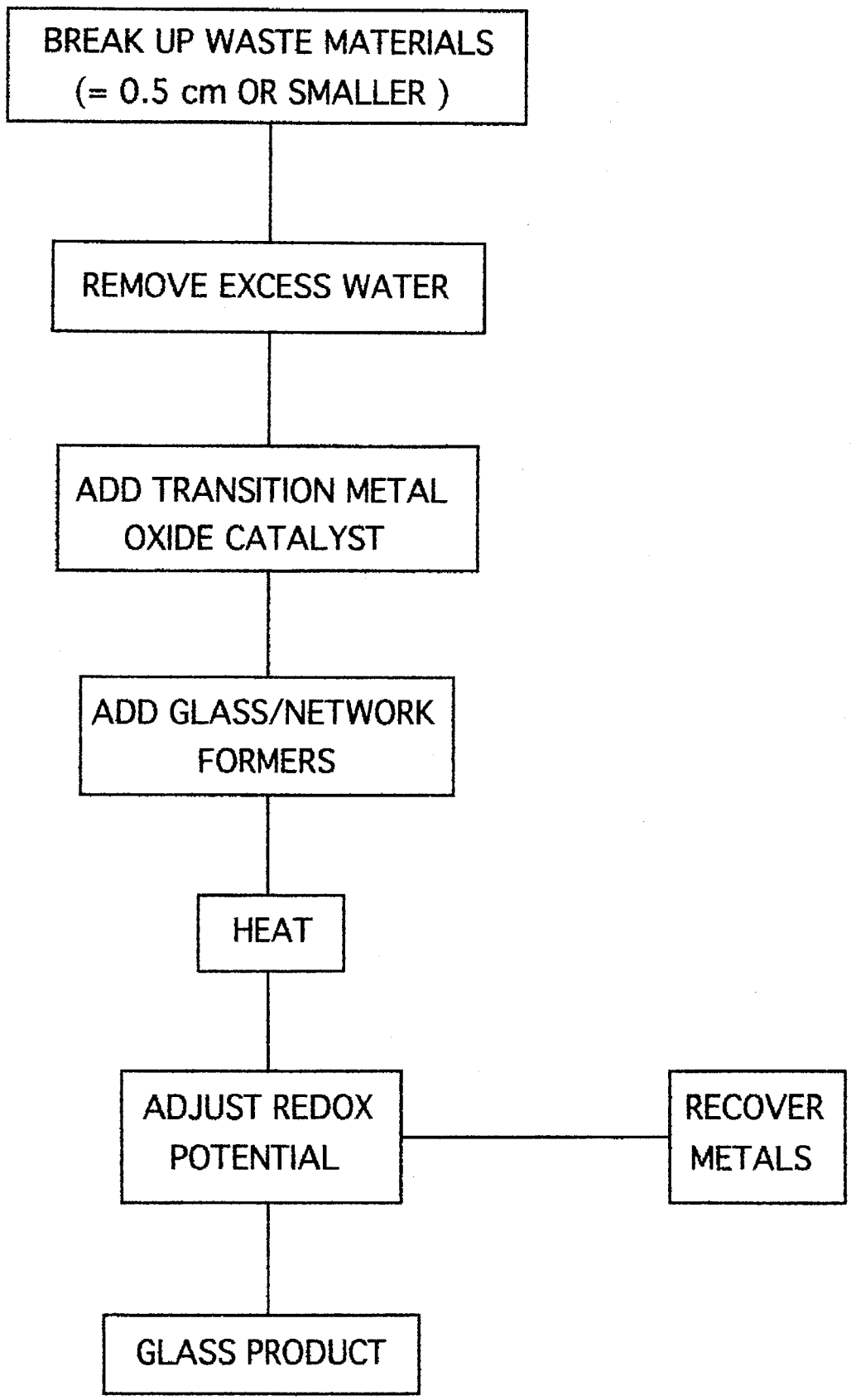

ized glass product made according to the process. The
invention also relates to a process for recovering metals
from organics-containing wastes. 2. Discussion of Background

VITRIFICATION OF ORGANICS-CONTAINING WASTES

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to waste vitrification processes. More particularly, the present invention relates to a process for stabilizing organics-containing wastes, and to a waste glass product made according to the process. The invention also relates to a process for recovering metals from organics-containing wastes. 2. Discussion of Background Numerous methods are available for the proper and safe disposal of waste materials, including disposal in landfills, incineration, vitrification, etc. Waste treatment processes may themselves generate hazardous wastes. For example, when solids are filtered from a waste stream, the spent filter medium may contain heavy metals and other hazardous substances, and must be treated and stabilized before disposal. (As used herein, the term "hazardous waste" includes wastes containing substances commonly recognized as hazardous, including but not limited to chemical wastes, radioactive wastes, mixed chemical and radioactive wastes, heavy-metal-containing wastes, and hazardous organics.) Despite these efforts, there remains a large volume of hazardous waste material, including organics-containing waste, that must be safely disposed of.

Many types of wastes, including ion exchange resins and waste electronic components such as used circuit boards, vacuum tubes, transistors and so forth, contain metals, organic compounds and potentially leachable constituents. Even though the concentration of metals in these types of wastes may be small, the overall waste volume is large. In the U.S. alone, these wastes may contain many thousands of pounds of precious metals (Au, Ag, Pt, etc.) as well as base metals (Cu, Pb, Fe, Mn, etc.). There is a growing interest in the recovery of useful metals from these types of wastes.

A number of techniques have been used to treat hazardous waste, including vitrification, which involves dissolving or encapsulating the wastes in a stable, leach-resistant glass matrix. Typically, the waste is mixed or slurried with glass formers and fed to a glass melter, where the mixture is heated until it is molten. The waste is incorporated into the glass matrix in such a way that the final, cooled product resists leaching for very long periods of time. Because glass is very stable against chemical attack, vitrification has been studied for decades in connection with radioactive wastes. Other hazardous wastes and mixed wastes (wastes that contain both radioactive and hazardous materials) may also be treated by vitrification.

However, there are a number of problems associated with vitrification. For example, the quality of the waste glass produced depends on the constituents of the melt, including the composition of the waste itself and the composition of any additives that are added to the waste to form a glass-forming mixture. Stable glass formulations typically contain no organic materials (or only trace amounts of organics), and generally avoid or restrict the concentration of transition metals. Thus, vitrification alone is not suitable for treating wastes that contain substantial amounts of organics and/or transition metals (including precious metals such as Au, Ag, Pd and Pt). These constituents must be recovered or destroyed before the waste residue can be vitrified to form a stable, environmentally safe product.

Catalysts are substances that alter the rate of a process, and are either incorporated into the process without adverse consequences, or recoverable essentially unaltered in form and amount at the end of the process. Many types of catalysts are known, including pure metals such as Fe, Ni and Pt, organic and inorganic compounds, organometallic compounds, and complexes of organic groups and metal halides. The action of a catalyst can be altered by the addition of a catalyst poison, which interferes with catalytic action, or a catalyst promoter, which activates fresh catalysts, reactivates spent catalysts, or reacts with a catalyst poison. Many present-day industrial processes, including waste treatment processes, depend on the use of catalysts.

Catalysts are used in several wastewater treatment processes. Mitsui, et al. (U.S. Pat. No. 4,751,005) use a composite metal oxide catalyst in a process for wet oxidation of wastewater. In U.S. Pat. No. 5,192,452, they also teach contacting water with ozone in the presence of a first catalyst (silicon dioxide, titanium oxide, zirconium oxide or aluminum oxide), then a second catalyst (manganese, iron, nickel, gold, platinum). Lichtin, et al. (U.S. Pat. No. 4,861,484) use transition elements and peroxide ($H_2O_2$) for the controlled photodegradation of organic wastes. The wastes, in fluid form, are mixed with the catalyst, then exposed to photo-energy which is absorbed by the catalyst to degrade the wastes. Ishii, et al. (U.S. Pat. No. 5,145,587) disclose wet oxidizing of organics-containing wastewater in the presence of titanium dioxide, an oxide of an element of the lanthanide series, and a metal (Mn, Fe, Cu, Ag, Au, Pt, Pd, etc.) or a water-insoluble or sparingly water-soluble compound of said metal. Also, Wilms, et al. (U.S. Pat. No. 4,294,703) describe a process for treating organic wastes at a temperature in the range 5°–100° C. in the presence of peroxide and a transition metal oxide.

Although many waste treatment processes are known, there is no known, routinely-used, cost-effective process for selectively recovering metals from organics-containing wastes, oxidizing organics contained in the wastes, and stabilizing the waste residue for disposal. Such a process should be simple, flexible, substantially reduce the overall waste volume, and produce a stable, durable product.

SUMMARY OF THE INVENTION

According to its major aspects and broadly stated, the present invention is a process for stabilizing organics-containing wastes, recovering metals from the wastes, and a waste glass product made according to the process. The process can be used to recover useful metals (including noble metals) from wastes, and encapsulate and immobilize the remainder of the wastes for disposal. Metals recovery and vitrification are accomplished in a simple process that results in significant volume reduction and formation of a highly durable waste glass product.

Vitrification of wastes such as organic ion exchange resins, electronic components and the like is accomplished by mixing at least one metal oxide with the wastes, and, if needed, glass formers to compensate for a shortage of silicates or other glass formers in the wastes. The metal oxide increases the rate of oxidation of organic materials in the wastes to improve the composition of the glass-forming mixture. In addition, the oxide buffers the redox potential of the glass melt so that metals such as Au, Pt, Ag, and Cu are reduced from the ionic to the metallic state and can be recovered from the melt. After the metals are recovered, the remainder of the melt is vitrified, allowed to cool, and may subsequently be disposed of.

A major feature of the present invention is the use of metal oxides in the vitrification of organics-containing wastes. Surprisingly, it has been found that mixing metal oxides (preferably, transition metal oxides) with organics-containing wastes accelerates oxidation of the organics. This ensures more complete oxidation of any organics in the wastes, resulting in a better-quality melt and a more stable, environmentally-sound waste glass product. The oxides also buffer the redox potential of the melt to a level where precious metals are reduced from the ionic state to the elemental (i.e., metallic) state. (The terms "redox," "redox potential," and "oxidation-reduction potential" refer to a measure of the state of oxidation of a system. The "reduction potential" is the potential drop involved in the reduction of a positively charged ion to a neutral form or to a less highly charged ion; or of a neutral atom to a negatively charged ion. Conversely, the "oxidation potential" relates to oxidation of an ion to a less negative or neutral form.)

The mechanism by which metal oxides promote oxidation depends on the temperature of the glass-forming mixture. At temperatures below its melting point, the metal oxide acts as a catalyst to accelerate oxidation of organics via well known surface action processes. At higher temperatures, it dissolves into the melt and the dissociated oxygen ions serve as a source of oxygen for organics oxidation. At vitrification temperatures, a cycle is established where the metal ions are reduced, for example, from Fe(III) to Fe(II), and reoxidized to form Fe(III) and O$^-$ upon contacting oxygen at the surface of the melt. At the point of oxidation of organics, the Fe(III) ions are again reduced to Fe(II); the Fe(III) and oxygen ions are diffused through the melt to provide a source of oxygen for oxidizing additional organics (and other oxidizable materials). Thus, the metal ions act as oxygen carriers, the molecular equivalent of an oxygen lance, conducting oxygen from the surface into the melt to oxidize the remaining organics.

An important feature of the present invention is the buffering action of the metal oxide. The dissolved metal ions adjust the redox potential of the melt to a predetermined value that depends on the metal ion concentration of the melt, so that metals having reduction potentials above that value are reduced from the ionic state to the elemental metal state. In addition, the redox potential of the melt can be adjusted to produce a stable glass product that resists leaching.

Another feature of the present invention is that metals, including noble metals, can be recovered from the melt in the metallic state rather than being chemically bonded to the glass matrix structure as in conventional vitrification processes. Other metals such as Pb, Mn and Fe remain dissolved in the melt and are bonded to the glassy product.

Still another feature of the present invention is its flexibility. The types and amounts of additives mixed with the wastes—metal oxide, glass formers, network formers—are selected depending on the composition of the wastes to be treated, the metals to be recovered, and the desired properties of the glass product. Furthermore, the metal oxide can be added as part of another type of waste, further reducing the overall final waste volume. Whether or not additives are needed to produce a stable product, the product has good leaching resistance and can be disposed of in an ordinary landfill. Alternatively, for nonradioactive wastes, the product can be used as a filler in materials such as concrete, asphalt, brick and tile.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a flow chart of a process for treating wastes according to a preferred embodiment of the present invention.

DETAILED DESCRIPTION OF A PREFERRED EMBODIMENT

It has been determined that vitrification of organics-containing waste materials is improved by mixing at least one metal oxide (preferably, a transition metal oxide) with the wastes. When the resulting mixture is heated, the metal oxide increases the rate of oxidation of organic materials in the wastes, thereby improving the formulation of the glass melt and the final product. The metal oxide also buffers the redox potential of the melt so that metals such as Ag, Au, Cu, Pd and Pt are reduced to the metallic state. After these metals are recovered from the melt, the remainder of the melt is vitrified, allowed to cool, and may subsequently be disposed of. The process facilitates recovery of noble metals from the wastes, and immobilizes the remainder in a stable, durable glassy matrix. The process is especially well-suited for wastes containing silicates, such as ion exchange resins and waste electronic components, but silicates or other additives can be added to other wastes to produce the composition required for vitrification.

It has been determined that metal oxides act as "catalysts" to improve the efficiency of oxidation of organics (and other oxidizable materials) in waste vitrification processes by several mechanisms. The predominant mechanism by which these compounds promote oxidation depends on the temperature of the glass-forming mixture: at low temperatures, the oxides catalyze oxidation of at least some of the organics in the mixture by well known surface action processes; at higher temperatures, the oxides dissolve and the highly oxidized ions and dissociated oxygen ions provide a source of oxygen for oxidizing more of the organics; at still higher, vitrification temperatures, the metal ions act as oxygen carriers or "lances" to conduct oxygen into the melt from the surface as will be described below. In addition, the metal ions buffer the redox potential of the melt, so that dissolved metals having reduction potentials above a predetermined value are reduced to the metallic state and can be drawn off from the remainder of the melt.

A flow chart of a process according to the present invention is shown in FIG. 1. The process is implemented generally as follows:

1. Break up the waste materials by pulverizing, grinding, etc. to assist melting and mixing with the transition metal oxide.

Breaking up solid wastes, preferably into particles on the order of 0.5 cm or smaller in size, facilitates mixing with the oxide (and other additives such as glass formers, intermediates, etc., if needed to ensure complete vitrification and a stable product). The wastes may be cut, crushed, milled, or ground or pulverized to produce a powder if desired.

Wastes that can be treated by the process include ion exchange resins, electronic components such as circuit boards, vacuum tubes, transistors and integrated circuits, and other wastes that contain organic compounds.

2. Remove excess water.

To produce an acceptable melter feed, the solids content of the waste is adjusted to at least approximately 50 wt. % by evaporating excess water (alternatively, the solids content is adjusted after mixing with the catalyst (Step 3)).

3. Mix the wastes with a finely divided metal oxide compound to form a first mixture.

Oxides of the transition metals are preferred, where the term "transition metal" is used in the customary sense to mean any of the elements having atomic number 21–29, 39–47, 57–79 and 89 or higher. However, oxides of other metals may also be useful for the practice of the invention. Suitable compounds for use with the invention include oxides of Ti, Cr, Mn, Fe, Co, Ni, Cu, Al, Sn, Mo, Pd, Ag, and Pt, particularly readily available compounds such as $Fe_2O_3$, FeO, $Fe_3O_4$, $MnFe_2O_4$, $MnO_2$, $Mn_3O_4$, $Mn_2O_3$, MnO, $NiFe_2O_4$, and mixtures thereof.

A sufficient amount of the metal oxide is added to enable any organic materials (and other oxidizable materials) in the wastes to be substantially oxidized, and, if metals recovery is desired, to buffer the redox potential of the glass melt to a level where the selected metals are reduced to the metallic (i.e., elemental) state.

The amount of metal oxide added to the wastes depends on the choice of oxide (or oxides) and the composition of the wastes. The needed amount may be found by determining the amount of organic material to be oxidized, i.e., the amount of waste materials to be treated and the organics concentration of the materials. Alternatively, the carbon content of the wastes, and the amount of oxygen needed to oxidize that amount of carbon, may be determined. Preferably, a sufficient amount of the metal oxide is added to provide at least a stoichiometric amount of oxygen, or at least approximately one mole of oxygen per mole of carbon.

Some types of wastes may already contain transition metal oxides. By way of example, high level radioactive wastes (HLW wastes) typically contain a wide range of compounds including oxides of aluminum, iron and manganese, fission products, nitrates, nitrites, hydroxides, titanates, and tetraphenylborate salts. For these wastes, the type and amount of oxide added to the wastes may be adjusted according to the types and amounts of transition metal oxides already present in the wastes.

For wastes that need additional transition metal oxides to ensure oxidation of organics, these may be supplied in the form of any compound or mixture that contains sufficient transition metal oxides, including different types of waste.

4. If needed, add glass formers and other additives.

If the wastes do not contain sufficient silicates or other glass formers, the first mixture may not be completely vitrified when heated (Step 5). In that case, silicates or other materials that contain glass formers, including but not limited to recycled glass (cullet), glass frit, quartz, fiberglass, alumina, silica, and oxides of boron, sodium and calcium, can be added. Depending on the composition of the wastes and the selection of metal oxide, other additives such as fluxes, glass modifiers and intermediates may be added.

Some wastes, such as ion exchange resins and circuit boards, may already contain sufficient glass formers for vitrification. Other wastes may require additional glass formers, either supplied in pure form or as a different type of waste (for example, frit, waste glass, or wastes that contain glass formers). The wastes may be analyzed before treatment to determine whether additional glass formers or other additives are needed to produce a stable, leach-resistant product. Then, the types and amounts of glass formers and other additives needed to provide the desired final product composition are added to the wastes before heating.

5. Heat the first mixture to a temperature below the glass transition temperature.

Once the mixture containing waste materials, metal oxide or oxides, glass formers and other additives is heated to a temperature of at least approximately 550° C., the transition metals will aid in the oxidation of the organics. When the required amount of oxidation has occured, then the temperature is raised. At the higher temperature (generally at least 1050° C.) the glass formers will melt and encapsulate the remainder of the wastes. If desired, the temperature may be raised until the glass becomes very fluid. When the glass becomes sufficiently fluid, the reduced metals will settle to the bottom of the melt for recovery.

During heating, the metal oxide increases the oxidation rate by several mechanisms. At temperatures below the metal oxide's and the glass former's melting point, the oxide acts as a catalyst to accelerate oxidation of at least some of the organics in the second mixture via surface reaction kinetics. At higher temperatures, the oxide dissolves into the melt and the oxygen ions provide a source of oxygen for oxidation of more of the organics. For example, the following reactions may occur when the first mixture contains $Fe_2O_3$:

$$3Fe_2O_3 + C \rightarrow CO + 2Fe_3O_4,$$

$$Fe_3O_4 + C \rightarrow 3FeO + CO,$$

$$FeO + C \rightarrow Fe + CO.$$

Other oxidation products may include carbon dioxide ($CO_2$) and nitrogen oxides ($NO_x$, where x is an integer). Similar reactions may occur for other transition metal compounds, including oxides of Ti, Cr, Mn, Co, Ni, Cu, Al, Sn, Mo, Pd, Ag, and Pt.

At temperatures above the melting point of the catalyst and the glass formers, the transition metal ions act as conductors of oxygen (i.e., oxygen or air "lances") from the free surface of the melt to the reacting particles. For example, the Fe(III) ion is reduced to Fe(II) as follows:

$$3Fe_2O_3 + 3C \rightarrow 6FeO + 3CO$$

or $$2Fe(III)_{dissolved} + C \rightarrow 2Fe(II)_{dissolved} + CO.$$

When the Fe(II) ion contacts oxygen (at the free surface of the melt, or at the interface between an oxygen-containing bubble and the melt), the ion is re-oxidized to Fe(III):

$$4Fe(II)_{dissolved} + O_2 \rightarrow 4Fe(III)_{dissolved} + 2O^{(2-)}\text{dissolved}.$$

Elsewhere in the melt, the Fe(III) ions may be reduced to Fe(II); the dissolved oxygen ions are thus carried from the surface to locations throughout the melt, where the ions are available to oxidize organics (and other oxidizable materials) contained therein.

To control the release of off-gas and optimize the effect of the catalyst on organics oxidation, the second mixture is preferably heated in stages. That is, the second mixture is heated to a first temperature below the melting point of the transition metal oxide, and held at that temperature so that at least a portion of the organics in the mixture are oxidized. The mixture is then heated to a second temperature at least approximately equal to the melting point of the transition metal oxide, and held at the second temperature until more of the organics are oxidized. Finally, the second mixture is heated to a third temperature sufficient to melt and vitrify glass formers. The temperature ranges wherein the catalyst acts according to the above-described mechanisms depend on the choice of catalyst and the composition of the wastes to be treated. Thus, the optimum temperatures are best determined by identifying the constituents of each mixture and the temperatures at which each constituent will combust and melt.

Controlled heating is preferable to manage the generation of particulates and off-gas by the decomposing organic compounds. Off-gas constituents may contain a wide range of compounds including CO, $CO_2$, $NO_x$, halogen compounds and volatile organics. Overly-rapid heating may generate greater amounts of off-gas and particulates than can be safely handled by the off-gas system. In addition, carbon deposits (soot, tar) can cause sulfidization or carburization of melter equipment. Thus, the optimum heating rate depends on the types and quantities of organics known to be in the wastes, and the capabilities of the off-gas system.

6. Adjust the redox potential of the melt.

Redox control is important in vitrification processes, and is accomplished by balancing the mounts of reducing agents and oxidizing agents in the melter feed and plenum. For a melter feed that includes organic compounds, the redox state of the waste glass product is determined by balancing the reducing potential of the feed organic compounds and the oxidizing potential of the gases above the melt, as well as any nitrates or polyvalent elements in the wastes. Control of the redox state can lead to better metal retention within the melt (if that is desired), a more durable product, more efficient heat transfer within the melt, and better destruction and removal of organic compounds in the melter feed.

When the second mixture is heated to vitrification (fusion) temperature and maintained at approximately that temperature (Step 5), the transition metal ions buffer the redox potential of the melt to a level where metals having positive reduction potentials are reduced to the metallic or elemental state. If the temperature of the melt is higher than the melting points of these metals, the metals do not remain uniformly mixed with the second mixture, but tend to separate from the remainder of the second mixture and settle near the bottom of the melter. Therefore, to ensure reduction (and recovery) of these metals, the second mixture is heated to a temperature that is above the melting point of the metals.

In order to reduce selected metals (Au, Ag, Pt, Pd, Cu, etc.) while maintaining other metals in the dissolved state, it is necessary to adjust the redox potential of the melt so that conditions are reducing for the selected metals and oxidizing for other metals (Pb, Fe, Mn, etc.). As seen in the following Table 1, reduction potentials $E°$ for noble metals such as Au tend to be more positive than reduction potentials for base metals such as Pb. These and other reduction potentials are found in many readily available publications, including those listed in the *CRC Handbook of Chemistry and Physics*, 71st Edition (1990), pp. 8–16–8–23 (incorporated herein by reference).

TABLE 1

Reduction potentials for Au, Cu, Pd, Pt, Fe, Mn and Pb.

| Reaction | $E°$ (V) |
| --- | --- |
| $Ag^+ + e \rightarrow Ag$ | +0.7996 |

TABLE 1-continued

Reduction potentials for Au, Cu, Pd, Pt, Fe, Mn and Pb.

| Reaction | $E°$ (V) |
| --- | --- |
| $Au^+ + e \rightarrow Au$ | +1.692 |
| $Au^{2+} + 2e \rightarrow Au$ | +1.401 |
| $Au^{3+} + 3e \rightarrow Au$ | +1.494 |
| $Cu^+ + e \rightarrow Cu$ | +0.521 |
| $Pd^{2+} + 2e \rightarrow Pd$ | +0.951 |
| $Pt^{2+} + 2e \rightarrow Pt$ | +1.118 |
| $Fe^{2+} + 2e \rightarrow Fe$ | −0.447 |
| $Mn^{2+} + 2e \rightarrow Mn$ | −1.185 |
| $Pb^{2+} + 2e \rightarrow Pb$ | −0.1262 |

The catalyst acts as a buffer to stabilize and control the redox of the melt, allowing improved control of this property which is critical for oxidation of organics and recovery of metals from waste products. By way of example, when the redox of the melt is adjusted so that metals with $E° \geq 0.5$ (Ag, Au, Pd, Pt, Cu) are reduced to the metallic state, metals with more negative $E°$ (Pb, Fe, Mn) are oxidized and remain substantially in the melt.

7. Recover the separated metals by any convenient means.

When the wastes contain elemental metals, these can be recovered by heating the melt to a temperature higher than the melting points of the metals. Metals in the ionic state can be recovered by adjusting the redox of the melt (Step 6) so that the desired metals are reduced, separate from the remainder of the melt, and collect at the bottom of the melter. The metals may then be drawn off and processed for re-use. If needed, the redox of the melt may be re-adjusted at this point to a level that ensures formation of a stable glass product.

8. Recover the waste glass product.

The product is in the form of a chemically stable, homogeneous glassy material, having a volume generally substantially less than the original waste volume. The composition of the product depends on the types of wastes being treated, process temperatures, the particular metal oxide (or mixture of oxides) added to the wastes, and whether or not additional glass formers and other additives are used. The product is a stable, durable material that meets Environmental Protection Agency (EPA) leaching standards, and thus, may safely be disposed of. Alternatively, if the product does not contain radioactive materials, it may be crushed or pulverized and used as a filler in construction materials such as brick, concrete, asphalt, tile, fencing and roofing materials, as a road underlay, fiberized into insulating material, and so forth.

The process according to the present invention is illustrated in the following non-limiting examples:

EXAMPLE 1

A cesium-specific resorcinol-formaldehyde resin was used to remove cesium-137 ($^{137}Cs$) from a wastewater solution created from the processing of nuclear fuel. The resin is described in commonly-assigned patent application Ser. No. 07/460,480, filed Jan. 3, 1990, now abandoned ("Cesium-Specific Phenolic Ion Exchange Resin"). When mixed with borosilicate glass frit and fed to a melter, the cesium-loaded resin accumulated on top of the melt in the form of a crust, increasing the time for the feed to become incorporated into the melt and allowing time for the cesium to volatilize instead of becoming immobilized in the glass product. In addition, the organics in the resin caused reducing conditions in the melt which could increase the volatility of alkali metals such as cesium and result in a less durable glass product.

When the cesium-loaded resin was mixed with borosilicate glass frit and HLW waste sludge, the sludge was dissolved into the melt and any organics present in the mixture were incinerated. The sludge was the residue of chemical reprocessing of uranium fuel and targets after irradiation in nuclear reactors, and contained fission products, actinides that were not recovered in the reprocessing facility, nitrates, nitrites, formates, and transition metal oxides (primarily oxides of aluminum, iron and manganese).

The molten glass was collected in stainless steel beakers, solidified, and compared to glass made with HLW sludge and borosilicate glass frit alone. The Fe(II) concentration of glass made with the resin-frit-sludge mixture was higher than the Fe(II) concentration of glass made without the resin, indicating that the iron was in a more reduced state due to the presence of organic resin, therefore the Fe(III) oxide of the sludge provided oxidizing capability for the organic (Fe(II), is a network modifier and reduces durability, while Fe(III) is a network former that increases durability). If desired, the melt could be reoxidized by allowing equilibration with air, by lancing with air or oxygen.

EXAMPLE 2

High purity alumina crucibles were filled with identical amounts of glass forming materials (approximately 20 g frit, 2.5 g anhydrous borax, 2.5 g $Fe_2O_3$, 2.5 g $Na_2CO_3$) and varying amounts of water. In addition, varying amounts of carbon (as a reducing agent) and cesium carbonate were added to some of the crucibles; the organic resin of Example 1, loaded with 0.16 g cesium per gram of dry resin, was added to other crucibles. All mixtures were ground and stirred to ensure uniform blending, then the crucibles were placed in a furnace and heated to 1100° C. After three hours, the crucibles were removed from the furnace and air quenched.

The redox state and cesium content of the glass samples were analyzed. The redox state was determined by measuring the Fe(II)/Fe(total) ratio of the glass: less reduced glasses had low Fe(II)/Fe(total) ratios and were yellow in color, whereas more reduced glasses had higher Fe(II)/Fe(total) ratios and were green in color. The Fe(II)/Fe(total) value of each sample was directly proportional to the mounts of carbon, resin and water originally present in the mixture. It was found that one gram of carbon had approximately the same reducing capability as 3.7–4 grams of resin under similar circumstances.

Cesium retention for the resin-containing mixtures, where the resin acted as a reducing agent, averaged 88.6% with a standard deviation of 6.6%. Cesium retention for the mixtures using carbon as a reducing agent was 66.8% with a standard deviation of 4.9%, indicating that cesium retention was higher for the resin-containing mixtures. Cesium retention was independent of the redox ratio and the mass of the reducing agent.

EXAMPLE 3

Borosilicate glass frit and simulated HLW sludge were mixed to form a slurry. The frit included oxides of Si (77 wt. %), B (8 wt. %), Li (7 wt. %), Mg (2 wt. %), and Na (6 wt. %). The slurry included oxides of a number of transition metals, primarily Fe, Al, K, B, Mn, Si, Na and Ca; however, lesser amounts of oxides of Ni, Ti, Cu, Zr, Ba, Cr, Cs, Mg, and Pb were also present.

The slurry was fed to a stirred Joule-heated melter at a rate of 50 mL/min, and heated to a temperature of approximately 1070° C. to form a melt. After an exit glass stream was established, 300 g of the resin of Example 1 was batch fed to the melt in 30–100 g portions. The melt was sampled periodically; the samples were analyzed to determine the Fe(II)/Fe(total) ratio and provide an indication of the redox state of the melt.

Organics oxidation depends on the availability of oxygen, which in turn depends on the oxygen transfer rate (the number of moles of oxygen entering the melt). The oxygen transfer rate can be approximated by multiplying the moles of iron in the melt that change from Fe(II) to Fe(III) by the stoichiometric ratio of Fe(II) to $O_2$ (0.25). If the iron content of the melt is known, this rate can be estimated by observing the change in the Fe(II)/Fe(total) ratio.

Measured Fe(II)/Fe(total) ratios (and, therefore, oxygen transfer rates) depended on the melter stirring speed and the water content of the slurry. The oxygen transfer rate was proportional to elapsed time:

$$N_{O_2} = At + B,$$

where $N_{O_2}$ is the number of moles of oxygen in the melt existing as $Fe_2O_3$, t is the elapsed time in minutes, and A and B are empirical constants dependent on the slurry feed rate, impeller agitation, rate of water feed to the melter, and oxygen sparging rate.

It was determined that an oxygen transfer rate of 0.0023 moles $O_2$/min. was sufficient to oxidize 0.0023 moles/min. (0.00276 g/min) carbon, that is, one mole of oxygen was needed to oxidize one mole of carbon. Since approximately 4 g of resin was roughly equivalent to 1 g carbon in reducing capability (Example 2), approximately 0.0208 moles $O_2$ would be needed to oxidize each gram of resin.

EXAMPLE 4

Approximately 11 L of the slurry of Example 3 was mixed with 295 g of wet resin loaded with nonradioactive cesium (0.16 g cesium per gram of dry resin). The resulting mixture was added to a stirred Joule-heated melter at a rate of 50 mL/min. Samples of the exit glass were taken periodically and analyzed for Fe(II)/Fe(total) ratio. The average ratio after approximately one hour of operation was 0.176, indicating that organics in the resin were oxidized.

Use of the method allows recovery of metals from organics-containing wastes, while oxidizing potentially hazardous organics and greatly reducing the overall waste volume. The catalyst may be supplied in the form of a waste stream containing suitable transition metal oxides for oxidizing the organics contained in the wastes, further reducing the overall waste volume. The waste residue is contained in a stable, nonporous glassy matrix that meets EPA leaching standards, thus, the final product may safely be disposed of in an ordinary landfill, or used as a filler in construction materials.

It will be apparent to those skilled in the art that many changes and substitutions can be made to the preferred embodiment herein described without departing from the spirit and scope of the present invention as defined by the appended claims.

What is claimed is:

1. A process for stabilizing waste, said waste containing organic materials, said process comprising the steps of:

mixing at least one metal oxide with said waste to form a first mixture;

heating said first mixture so that said organic materials are oxidized in the presence of said metal oxide, thereby forming a second mixture; and vitrifying said second mixture.

2. The process as recited in claim 1, wherein at least a stoichiometric amount of said at least one metal oxide is mixed with said waste to oxidize said organic materials.

3. The process as recited in claim 1, a sufficient amount of said at least one metal oxide is mixed with said waste to provide at least one mole of oxygen for each mole of said carbon.

4. The process as recited in claim 1, wherein said at least one metal oxide is a transition metal oxide.

5. The process as recited in claim 1, wherein said at least one metal oxide is selected from the group consisting of $Fe_2O_3$, FeO, $Fe_3O_4$, MnO, $MnFe_2O_4$, $MnO_2$, $Mn_3O_4$, $Mn_2O_3$, and $NiFe_2O_4$.

6. The process as recited in claim 1, wherein said heating step further comprises the steps of:
heating said first mixture to a first temperature wherein said at least one metal oxide catalyzes oxidation of a first portion of said organic materials;
heating said first mixture to a second temperature, said second temperature higher than said first temperature and sufficient to dissolve said at least one metal oxide so that said first mixture contains oxygen ions and metal ions, said oxygen ions oxidizing a second portion of said organic materials; and
heating said first mixture to a third temperature, said third temperature higher than said second temperature, said third temperature sufficient to enable said metal ions to conduct oxygen into said first mixture for oxidizing a third portion of said organic materials.

7. The process as recited in claim 1, wherein said waste contains at least one metal, and wherein said vitrifying step further comprises:
heating said second mixture to fusion temperature to form a melt, said melt having a redox potential;
adjusting said redox potential so that said at least one metal separates from said melt;
recovering said at least one metal; and
cooling said melt to form a solid glassy product.

8. A process for stabilizing waste, said waste containing organic materials and at least one metal, said at least one metal having a melting point, said process comprising the steps of:
mixing at least one metal oxide with said waste to form a mixture, said mixture having a redox potential;
heating said mixture to a temperature at least approximately equal to said melting point of said mixture in such a way that said organic materials are oxidized in the presence of said metal oxide and said at least one metal oxide buffers said redox potential to reduce said at least one metal;
recovering said metal from said oxidized mixture; and
vitrifying said oxidized mixture.

9. The process as recited in claim 8, wherein a sufficient amount of said at least one metal oxide is mixed with said waste so that said mixture has a redox potential sufficient to reduce said at least one metal.

10. The process as recited in claim 8, wherein at least a stoichiometric amount of said at least one metal oxide is mixed with said waste to oxidize said organic materials.

11. The process as recited in claim 8, wherein said at least one metal oxide is a transition metal oxide.

12. The process as recited in claim 8, wherein said at least one metal oxide is selected from the group consisting of $Fe_2O_3$, FeO, $Fe_3O_4$, MnO, $MnFe_2O_4$, $MnO_2$, $Mn_3O_4$, $Mn_2O_3$ and $NiFe_2O_4$.

13. The process as recited in claim 8, further comprising the step of cooling said vitrified mixture.

14. The process as recited in claim 8, wherein said heating step further comprises:
heating said mixture to a first temperature, said first temperature sufficient to enable said at least one metal oxide to catalyze oxidation of organic materials;
holding said mixture at said first temperature until at least a first portion of said organic materials is oxidized;
heating said mixture to a second temperature higher than said first temperature and sufficient to dissolve said at least one metal oxide so that said mixture contains oxygen ions and metal ions, said oxygen ions capable of oxidizing organic materials;
holding said mixture at said second temperature until at least a second portion of said organic materials is oxidized;
heating said mixture to a third temperature higher than said second temperature, said third temperature sufficient to enable said metal ions to conduct oxygen into said mixture for oxidizing organic materials; and
holding said mixture at said third temperature until a third portion of said organic materials is oxidized.

15. The process as recited in claim 8, further comprising the step of adding glass formers to said mixture so that said oxidized mixture vitrifies.

16. The process as recited in claim 8, wherein said waste contains water and wherein said process further comprises the step of removing a portion of said water so that said waste contains no more than approximately 50 wt. % water.

17. A waste glass composition, said composition made from waste containing organic materials, said composition made by a process comprising the steps of:
mixing at least a stoichiometric amount of at least one transition metal oxide with said waste to form a mixture;
heating said mixture so that said organic materials are oxidized in the presence of said at least one transition metal oxide;
continuing to heat said mixture until said mixture vitrifies; and
cooling said vitrified mixture to form a glassy product.

18. The composition as recited in claim 17, wherein said product has a desired redox potential, said redox potential dependent at least in part on an amount of said at least one transition metal oxide in said mixture, and wherein said mixing step further mixing a sufficient amount of said at least one transition metal oxide with said waste so that said product has said desired redox potential.

19. The composition as recited in claim 17, wherein said mixture has a redox potential, said redox potential dependent at least in part on an amount of said at least one transition metal oxide in said mixture, wherein said waste contains at least one metal, wherein said mixing step further comprises mixing a sufficient amount of said at least one transition metal oxide with said waste to adjust said redox potential so that said at least one metal is reduced, and wherein said process further comprises the step of recovering said reduced metal before vitrifying said mixture.

20. The composition as recited in claim 17, wherein said process further comprises the step of adding glass formers to said mixture.

\* \* \* \* \*